(12) United States Patent
Hsu et al.

(10) Patent No.: US 7,797,392 B2
(45) Date of Patent: Sep. 14, 2010

(54) SYSTEM AND METHOD FOR EFFICIENTLY SUPPORTING MULTIPLE NATIVE NETWORK PROTOCOL IMPLEMENTATIONS IN A SINGLE SYSTEM

(75) Inventors: Windsor Wee Sun Hsu, Sunnyvale, CA (US); Jaishankar Moothedath Menon, San Jose, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 2108 days.

(21) Appl. No.: 10/304,660

(22) Filed: Nov. 26, 2002

(65) Prior Publication Data
US 2004/0103206 A1 May 27, 2004

(51) Int. Cl.
G06F 15/167 (2006.01)
(52) U.S. Cl. .................... 709/213; 709/214; 709/215; 709/216
(58) Field of Classification Search .......... 709/203, 709/229, 223, 213, 214, 215, 216
See application file for complete search history.

(56) References Cited

U.S. PATENT DOCUMENTS

| | | | | |
|---|---|---|---|---|
| 5,812,779 | A | 9/1998 | Ciscon et al. | 395/200.53 |
| 6,195,359 | B1 | 2/2001 | Eng et al. | 370/401 |
| 6,199,112 | B1 | 3/2001 | Wilson | 709/227 |
| 6,269,380 | B1 | 7/2001 | Terry et al. | 707/200 |
| 6,564,228 | B1 * | 5/2003 | O'Connor | 707/200 |
| 6,795,824 | B1 * | 9/2004 | Bradley | 707/10 |
| 6,915,397 | B2 * | 7/2005 | Lubbers et al. | 711/162 |
| 2001/0052061 | A1 | 12/2001 | Fradette | 711/202 |
| 2002/0019874 | A1 | 2/2002 | Borr | |

(Continued)

FOREIGN PATENT DOCUMENTS

JP         200134567 A    5/1990

(Continued)

OTHER PUBLICATIONS

PCT Examination Report; International Application No. PCT/GB 03/04448; International Filing Date: Oct. 15, 2003; Date of mailing: Mar. 15, 2004; 6 pages.

(Continued)

Primary Examiner—John Follansbee
Assistant Examiner—Nghi V Tran
(74) Attorney, Agent, or Firm—Cantor Colburn LLP; Van Nguy

(57) ABSTRACT

An intelligent router routes a user request to a storage server that is capable of handling that request natively, without emulation. The request is routed automatically, without any instruction or interaction on the part of the user. The intelligent router includes a storage tank-like computing environment and a set of intelligent routers. The set of intelligent routers appears as a single entity to users by presenting a single network IP address. When the intelligent router receives a request, it examines the protocol type and routes the request to one of the appropriate storage tank clients. The intelligent router does not change the contents of the request message, and thus the storage tank system do not become aware of the existence of the intelligent router. Consequently, any return messages do not need to go through the intelligent router, unless desired.

39 Claims, 3 Drawing Sheets

U.S. PATENT DOCUMENTS

| | | | |
|---|---|---|---|
| 2002/0062387 A1 | 5/2002 | Yatziv | 709/236 |
| 2002/0099797 A1 | 6/2002 | Merrell et al. | |
| 2002/0085500 A1 | 7/2002 | Hargrove | 370/238 |
| 2002/0129216 A1* | 9/2002 | Collins | 711/170 |
| 2003/0065796 A1* | 4/2003 | Borr | 709/229 |

FOREIGN PATENT DOCUMENTS

| | | |
|---|---|---|
| JP | 4354438 A | 12/1992 |
| JP | 08-256167 A | 10/1996 |
| JP | 2000148651 A2 | 5/2000 |
| JP | 2002215554 A | 8/2002 |
| WO | WO 01/05996 A1 | 8/2001 |
| WO | WO 01/80014 A1 | 10/2001 |
| WO | 2069166 A1 | 9/2002 |

OTHER PUBLICATIONS

International Search Report; International Application No. PCT/GB 03/04448; International Filing Date: Oct. 15, 2003; Date of mailing: Mar. 15, 2005; 6 pages.

PCT Written Opinion; International Application No. PCT/GB 03/04448; International Filing Date: Oct. 15, 2003; Date of mailing: Mar. 12, 2004; 4 pages.

* cited by examiner

SYSTEM AND METHOD FOR EFFICIENTLY SUPPORTING MULTIPLE NATIVE NETWORK PROTOCOL IMPLEMENTATIONS IN A SINGLE SYSTEM

FIELD OF THE INVENTION

The present invention generally relates to distributed object storage systems for use in heterogeneous environments. More specifically, this invention pertains to a system and method for enabling users with different network protocols to communicate natively with a single system to obtain service.

BACKGROUND OF THE INVENTION

A large enterprise such as a business with many employees typically operates numerous networked computers. The computers need to store their data in a manner that allows access from other computers in the enterprise. Most often, this is accomplished by using a file system and file servers, storing the shared files on a common storage system. File system clients communicate with the file server using a well-defined network file protocol. When a file is created by a computer, it is written through a file server to the disks. When that file is read by the same or by another computer, the data is read from the disks, flows through the file server, and is then delivered to the computer that requested access to that file.

In many cases, computers accessing files are heterogeneous and may run many different operating systems such as AIX®, Microsoft Windows®, Solaris®, HP-UX®, and Linux®. Depending on the operating system they run, they may use different protocols for accessing the file server. For instance, systems running Microsoft Windows® tend to use the common Internet file system (CIFS) protocol while those running Unix® variations tend to use the network file system (NFS) protocol. Yet they all need access to the same files. Even if they access disjoint sets of files, it is much more convenient to be able to share the same file server.

There are attempts to build a file server that can talk various network protocols. These are called network attached storage (or NAS) systems. However, each NAS system is built upon a certain operating system, which has at most one native protocol. The CIFS server on Microsoft Windows® and the NFS server on Linux® (or any other Unix® variations) are considered the "native" implementations of the respective protocols.

Therefore, the NAS system has to handle the other protocols by emulation. For instance, emulated CIFS and emulated NFS have been implemented by the Network Appliance network attached storage product. Native CIFS and emulated NFS have been implemented by IBM's network attached storage NAS 200 product. Emulated CIFS and native NFS has been implemented by Veritas ServPoint® NAS system.

In general, emulated protocols are not fully compatible on function and/or performance with the native implementation, causing operational and communication difficulties. Also, it takes time and effort to develop the emulator so that when a new protocol or a new version of an existing protocol is introduced, it may not be supported by the NAS system for a while, if at all.

One way to address these problems has been to use a heterogenous file system (HFS). Such a system allows file sharing among heterogeneous systems such that all files can be accessed from any of its file system clients (HFS clients). The HFS clients can run different operating systems, each with its own native network protocol. These clients can therefore act as native server for their respective protocols.

However, the HFS clients are separate systems with different network IP addresses. Consequently, a user would need to know which protocol his/her computer is using, the protocols supported by each of the HFS clients, and specifically direct the request to the corresponding HFS client. This is further complicated by the fact that the information about the HFS clients can be dynamic as HFS clients become unavailable or are upgraded and replaced. Furthermore, performance is likely to be poor because there is an extra hop in going through the HFS client and then the HFS server.

Furthermore, when there is too much data to be handled by a single file server, multiple servers are required and the users have to know which file server has their data. When multiple servers are used, there is no easy way to balance the load across those servers.

What is therefore needed is a system that appears as a single entity (i.e., it presents a single system image) to the users and that can handle all their service requests (i.e., files) in an efficient and native manner, regardless of what protocol they are using and where their files are. The need for such a system has heretofore remained unsatisfied.

SUMMARY OF THE INVENTION

The present invention satisfies this need and presents an intelligent router system, a computer program product, and an associated method (collectively referred to herein as "the system" or "the present system") that accepts requests made using different protocols by various users and handles those requests by automatically routing them to a heterogeneous file system (HFS) client that supports the corresponding protocol.

To overcome the performance problems described earlier, the present system uses as heterogeneous file system (HFS) a recently developed Storage Tank™ system described in "IBM Storage Tank™ A Distributed Storage System", Jan. 24, 2002, at <http://www.almaden.ibm.com/cs/storagesystems/stortank/ExtStorageTankPaper 01_24_02.pdf>.

The system of the present invention is comprised of a HFS, specifically a Storage Tank™, and one or more intelligent routers. The HFS clients act as native server for their respective network protocols. For example, Microsoft Windows® HFS client and a Linux® HFS client can act as a CIFS server and an NFS server, respectively. However, the Microsoft Windows® and Linux® HFS clients are separate systems with different network IP addresses. Consequently, without the intelligent router of the present invention, a user would need to know which protocol his/her computer is using, the protocols supported by each of the HFS clients, and specifically direct the request to the corresponding HFS client. It is one objective of the present intelligent router to automatically direct the user to the correct HFS client, without instruction or interaction on the part of the user. It is another objective of the intelligent router to direct the user to the appropriate HFS client that is likely to offer good performance.

The intelligent router appears as a single entity with a single network IP address to the users. When the intelligent router receives a request, it examines the protocol type, such as common Internet file system (CIFS), or network file system (NFS), and routes the request to one of the appropriate HFS clients. The intelligent router forwards a CIFS request to a CIFS server and redirects an NFS request to an NFS server.

As described earlier, there could be a performance problem with this approach because there is an extra server in the path to the data, increasing the response time. To make this approach practical, the present system uses, for example, the Storage Tank™ system (referred to herein as ST or storage tank system) as the HFS. In ST, the HFS clients (ST clients) are connected to the storage disks directly using a storage network. They are also connected to a set of metadata servers (ST servers) via another network.

The ST protocol is a preferred protocol used to communicate between ST clients and ST servers. The protocol implements a locking and data consistency model that allows the storage tank distributed storage system to look and behave as a single file system. The ST client accesses the ST server only to read the metadata and to learn the location of the data of interest. With the metadata information, the ST client accesses the data directly. Removing the server from the path between the ST client and the data allows a much faster and more efficient data transfer connection.

The present system presents several key features, among which are the following:

In a preferred embodiment, the present system utilizes a set of intelligent routers together with a heterogeneous file sharing environment to achieve a single system image architecture that supports multiple network products.

The intelligent routers together, present a single network IP address to the users, and perform protocol-based routing.

The intelligent router allows a system architecture with "native" protocol implementation for each server type, rather than emulated versions of some protocols.

The intelligent router facilitates a system architecture that allows multiple heterogeneous users to share all files in a single file name space.

The ST client directs all metadata operations to the ST servers, and further directs all data operations to storage devices attached to a high-speed network. In addition, the ST client makes the metadata that is visible to the user's operating system (and to any applications running on the system) appear identical to metadata read from a native, locally attached file system.

When a message or request arrives as input to the system of the present invention, the intelligent router determines which protocol matches the user and routes that message to the appropriate ST client. When the ST client retrieves the data, the data is not necessarily returned to the user through the intelligent router. However, in other embodiments, the retrieved data could be routed through the intelligent router if necessary.

In the implementation of the intelligent router, a server appliance listens only to selected ports: e.g., port 139 for CIFS, and port 2049 for NFS. When a request arrives at one of the ports, the intelligent router uses a source machine unique identifier, such as the media access (MAC) address and protocol type, to determine the message destination. This ensures that the same ST client processes all requests from the same source machine, eliminating the need for the intelligent router to maintain state information for the protocols.

The intelligent router does not change the message contents, and therefore the ST clients are not aware of the existence of the intelligent router. Consequently, any return messages do not need to go through the intelligent router. Technologies developed for web server load balancing can be used to make a set of interrelated intelligent routers appear as a single system with the same hostname and/or IP address.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Container: a sub-tree of the global name-space. It groups a set of storage tank objects for the purpose of load balancing and management.

IP Network: Internet Protocol Network. IP specifies the format of packets, also called datagrams, and the addressing scheme. Most networks combine IP with a higher-level protocol called Transmission Control Protocol (TCP), which establishes a virtual connection between a destination and a source.

Metadata: Data about data; for example, tags that indicate the subject of a WWW document. Metadata describes, for example, how and when and by whom a particular set of data was collected, how the data is formatted, and where the data is located.

Native: Referring to an original form. For example, many applications can work with files in a variety of formats, but an application's native file format is the one it uses internally. For all other formats, the application must first convert the file to its native format.

Protocol: An agreed-upon format for transmitting data between two devices. The protocol determines the following: the type of error checking to be used; data compression method, if any; how the sending device will indicate that it has finished sending a message; and how the receiving device will indicate that it has received a message.

Server: A computer or device on a network that manages network resources.

Storage Pool: a collection of one or more volumes. It provides a logical grouping of the volumes for the allocation of space to containers. The files in a container can belong to different storage pools. Multiple containers can own storage within a single storage pool.

Volume: an exported storage device that may be a physical device or a logical device. Volumes are added to storage pools and must be accessible by all servers and the clients needing access to data on the volume.

Figure 1:
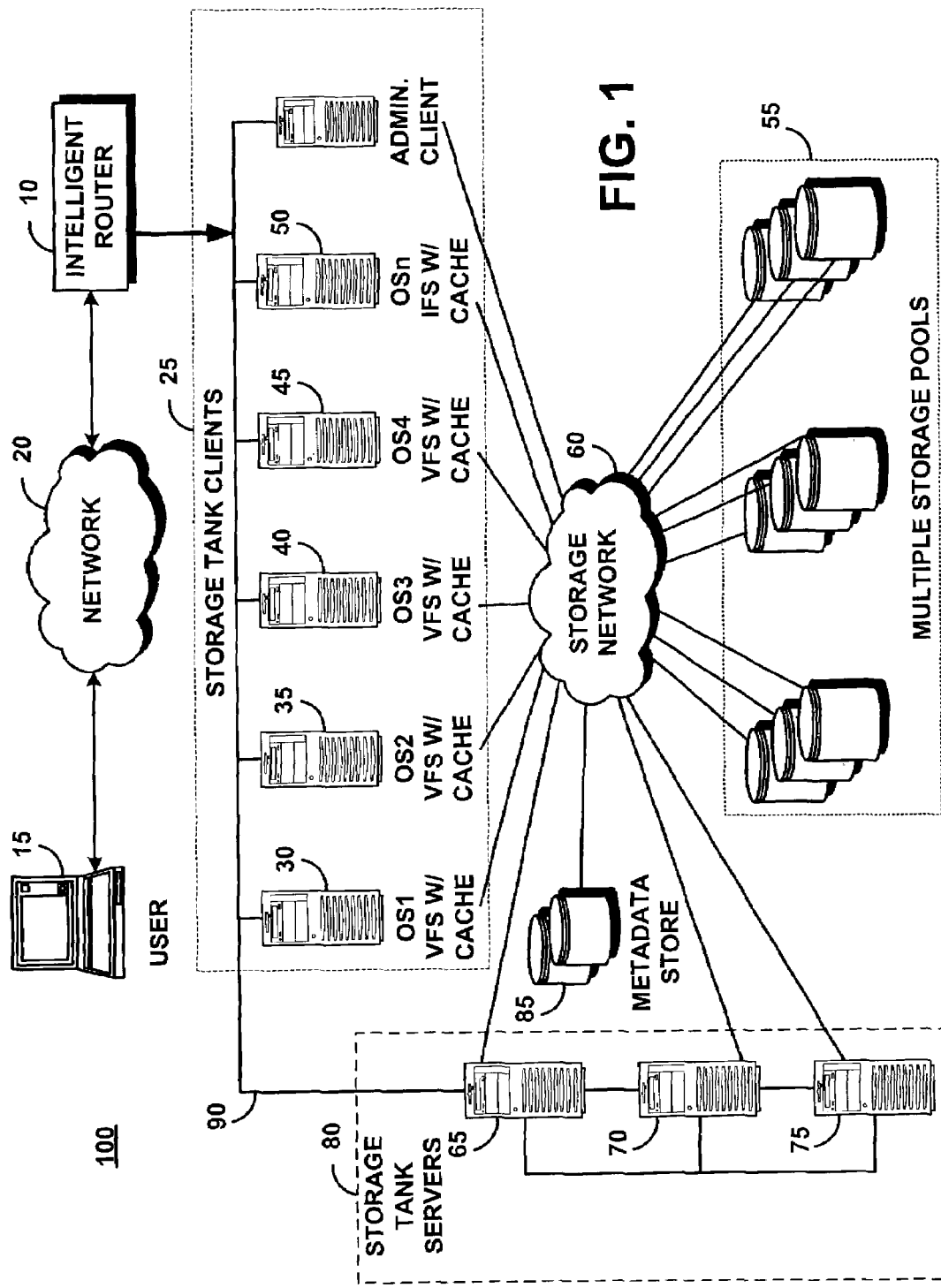
FIG. 1 is a schematic illustration of an exemplary operating environment in which a system and method for automatically selecting native protocol implementations through an intelligent router of the present invention can be used.

FIG. 1 illustrates an exemplary architecture of a storage tank system 100 utilizing an intelligent router 10 of the present invention. The intelligent router 10, operating either individually or as a set, presents to the user 15 through the network 20 a single network IP address and performs protocol-based routing to achieve a single system architecture that supports multiple network protocols.

The intelligent router 10 includes a software programming code or computer program product that is typically embedded within, or installed on a host server. Alternatively, the intelligent router 10 can be saved on a suitable storage medium such as a diskette, a CD, a hard drive, or like devices. While the system 10 will be described in connection with the WWW, the intelligent router 10 can be used with a stand-alone database of terms that may have been derived from the WWW and/or other sources.

The intelligent router 10 is connected to a block 25 of storage tank clients 30, 35, 40, 45, 50. Several different storage tank clients in the storage tank client block 25 are available to the intelligent router 10. Each individual storage tank client may use a different operating system or protocol. The intelligent router 10 allows system architecture with "native" protocol implementation for each server type rather than emulated versions of some protocols. As an illustration, storage tank client 30 uses AIX® operating system, storage tank client 35 uses Solaris® operating system, storage tank client 40 uses HP/UX® operating system, storage tank client 45 uses Linux® operating system, and storage tank client 50 uses Microsoft Windows® 2000 operating system.

The types of operating systems shown are indicative the wide variety of operating systems accommodated by intelligent router 10. Each of the storage tank clients 30, 35, 40, 45, 50 operates a storage tank client software that is implemented, for example, at the virtual file system interface (VFS) on the Unix® storage tank client, and as an installable file system (IFS) on Microsoft Windows® storage tank client. Consequently, the storage tank clients 30, 35, 40, 45, 50 are shown as either VFS or IFS.

The storage tank client block 25 shares data in multiple storage pools 55 through a storage network 60. The storage tank client block 25 is also connected to the metadata servers 65, 70, 75. The metadata servers 65, 70, 75 are clustered together to form a metadata server cluster 80. The metadata for the data stored in the multiple storage pools 55 is stored in the metadata store 85. The storage systems and devices that store computer data can be separated from the storage systems or devices that store storage tank metadata.

The storage tank system 100 of FIG. 1 uses two logical networks, the control network 90 and the storage network 60. The storage tank clients 25 direct all metadata operations to the storage tank servers 80 via the control network 90. The storage tank clients 30, 35, 40, 45, 50 make the metadata that is visible to the operating system of the user 15 appear identical to metadata read from a native. locally attached file system. The control network 90 carries only messages and metadata. The amount of data transferred over the control network 90 is minimal.

The storage tank client block 25 and metadata servers 80, multiple storage pools 55, and the metadata store 85 are all connected to the high-speed storage network 60. The storage network 60 is used for all data transfer. This removes the storage tank servers 80 from the data path, reducing performance overhead and eliminating potential data transfer bottlenecks.

The storage tank system 100 supports multiple storage pools 55 for its file data, and multiple storage pools for the metadata store 85. Unlike most file systems, the storage tank system stores metadata and data separately. Metadata, which includes standard file metadata such as file name, creation date, and access control information, also contains the location of the file data on disk (the extent list).

Metadata is kept on high-performance, highly available private server storage, which can be on the same storage network as the data storage or on a separate storage network, and is accessible by all the storage tank servers in the cluster. Metadata is not directly accessed by the storage tank clients 30, 35, 40, 45, 50, but is served via the storage tank protocol over the control network 90.

Data blocks for any given file are stored on disks in one of the storage pools. Data disks are configured on the storage network 60 to be accessible by both the storage tank clients 30, 35, 40, 45, 50 and the storage tank servers 80. In many situations, the storage network 60 would be configured with one zone for the storage tank data disks, clients, and servers. It is also possible, if desired, to create several zones that are exclusively accessible by the storage tank servers and a subset of storage tank clients to meet special security requirements for the user 15.

The user 15 communicates with the intelligent router 10 via the network 20. Network 20 can be the Internet, a local area network, or any other network.

The system can have one storage tank server such as server 65, a cluster of servers such as servers 80, or multiple clusters of servers 80. Clustered storage tank servers provide load balancing, fail-over processing, and increased scalability. The clustered storage tank servers 80 are interconnected either on their own high-speed network or on the control network 90 used to communicate with storage tank clients 30, 35, 40, 45, 50.

The storage tank protocol is the protocol used to communicate between the storage tank clients 30, 35, 40, 45, 50 and storage tank servers 80. The protocol implements a locking and data consistency model that allows the multiple storage pools (or storage tank distributed storage system) 55 to appear and behave as a single local file system. One objective of the storage tank protocol is to provide strong data consistency between the storage tank client block 25 and the storage tank servers 80 in a distributed environment.

The intelligent router 10 is connected to each storage tank client 25, 30, 35, 40, and 45 through a network, preferably the control network 90. When a message or request arrives from the user 15, the intelligent router 10 determines which protocol matches that used by the user 15, and routes that message to the appropriate storage tank client in the storage tank client block 25. For example, the user 15 runs the Linux® operating system, and wishes to access data in the files stored in the multiple storage pools 55. The intelligent router 10 recognizes from the message of the user 15 that the latter is using the NFS protocol. Consequently, the intelligent router 10 routes the file access request to a storage tank client 45 that supports the NFS protocol.

Figure 2:
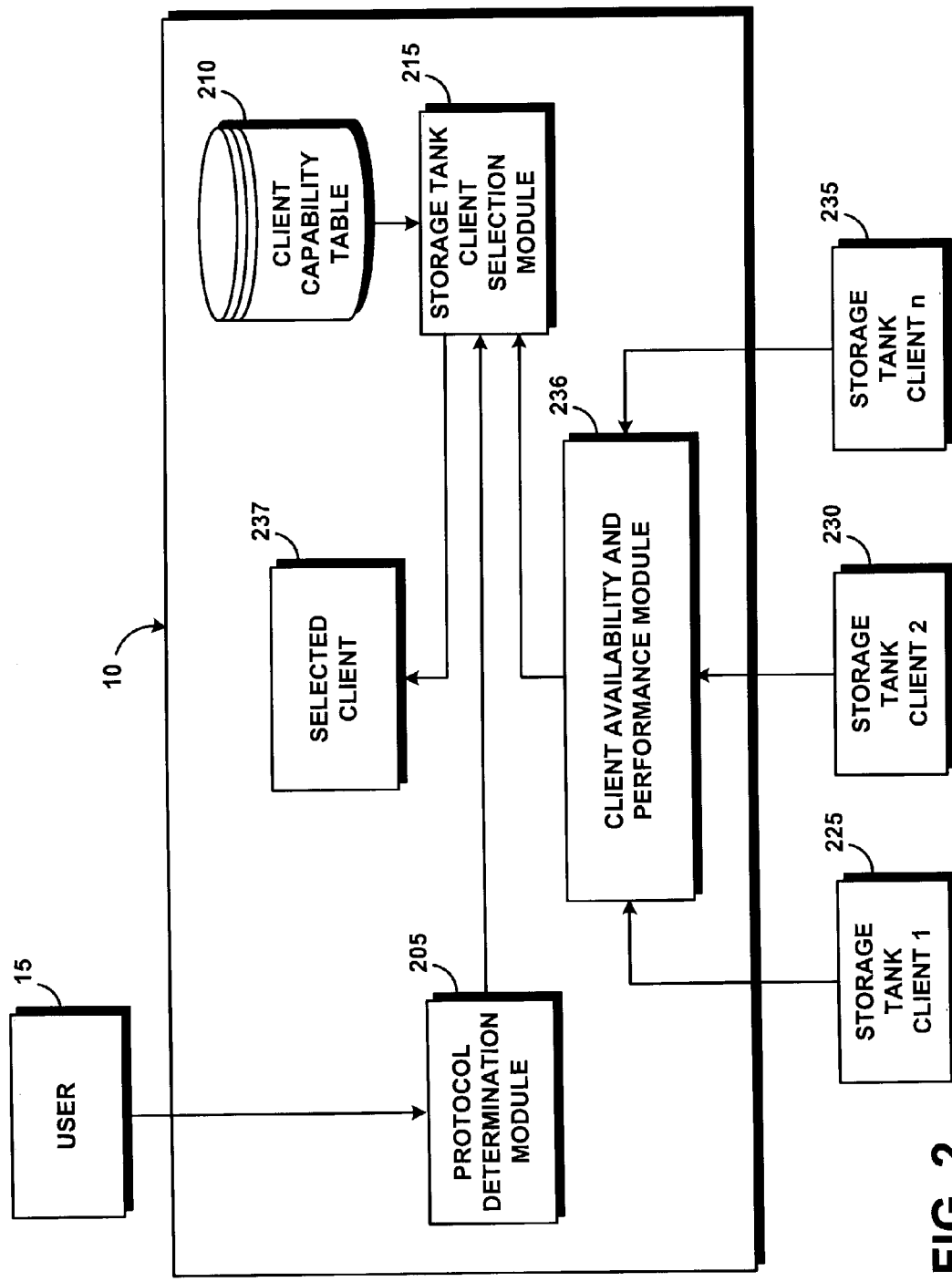
FIG. 2 is a block diagram of the high-level architecture of the intelligent router of FIG. 1.

FIG. 2 represents a high-level hierarchy of the intelligent router 10. The intelligent router 10 is generally comprised of a protocol determination module 205, a client capability table 210, and a storage tank client selection module 215. Many storage tank clients are available to the intelligent router 10, as represented by storage tank client 1 (225), storage tank client 2 (230), to storage tank client n (235).

Figure 3:
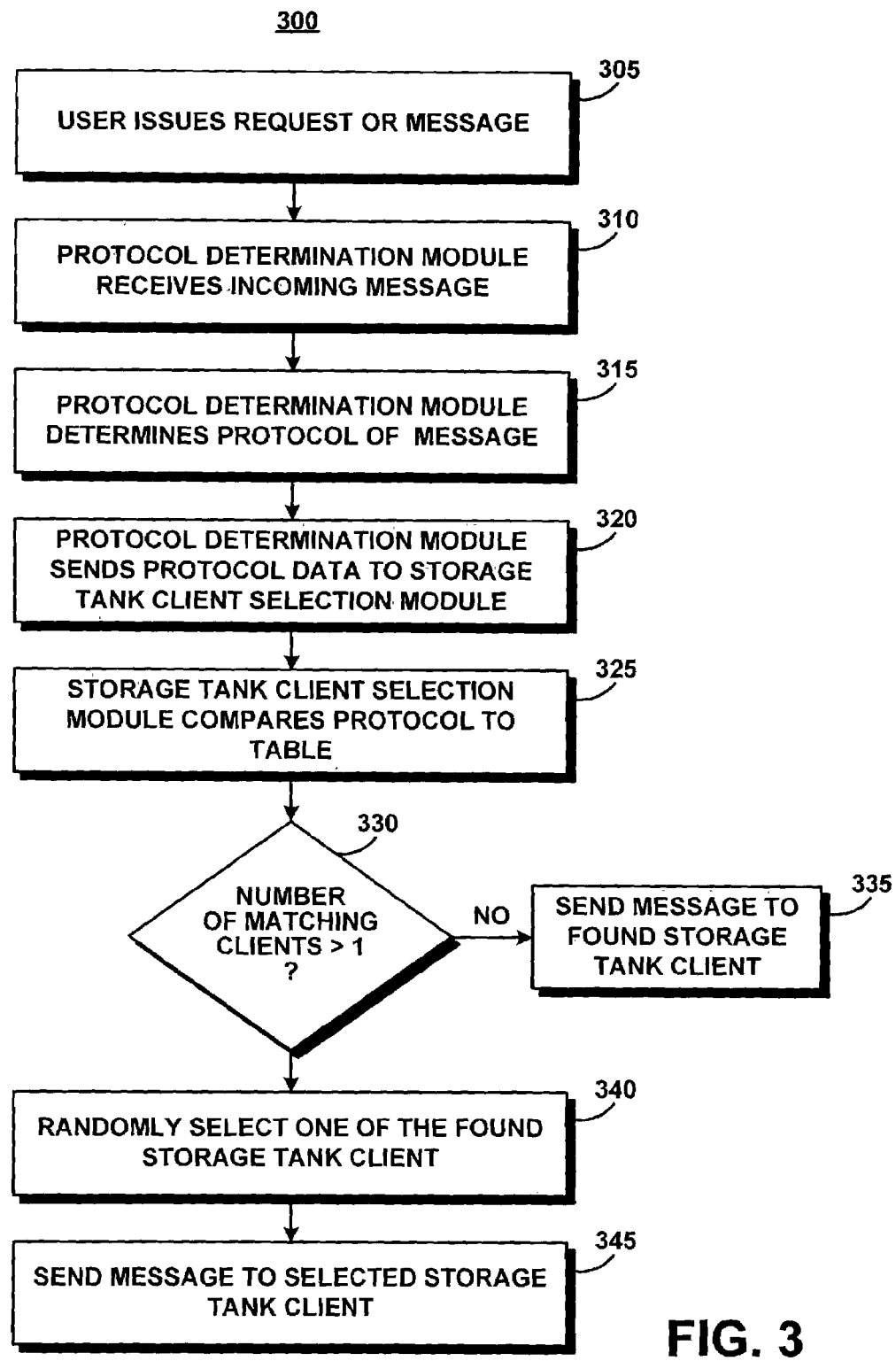
FIG. 3 is a process flow chart illustrating a method of operation of the intelligent router of FIGS. 1 and 2.

In operation, and with further reference to method 300 of FIG. 3, the user 15 issues a request or sends a message to system 10 in step 305. The protocol determination module 205 receives the request or message in step 310, and determines its protocol.

The intelligent router 10 listens only to selected ports: e.g., port 139 for CIFS and port 2049 for NFS. When a request arrives at one of the ports, the intelligent router 10 uses a source machine unique identifier, such as the media access (MAC) address and protocol type, to determine the message destination. This ensures that the same storage tank client 225, 230, or 235 processes all requests from the same upper level client 15. The protocol type might, for example, be common Internet file system (CIFS) or network file system (NFS). In a preferred embodiment, the storage tank clients 225, 230, and 235 are connected to a client availability and performance module 236 which, in turn, is connected to the storage tank client selection module 215. The storage tank client selection module 215 outputs the selected client, which is referenced by the numeral 237.

The protocol determination module 205 sends the protocol information for this message to the storage tank client selection module 215 in step 320. The storage tank client selection module 215 compares the message protocol with the protocols listed in the client capability table 210 in step 325. The client capability table 210 describes which storage tank clients 225, 230, 235 are available in the storage tank system 100 along with the native protocols that these storage tank clients support.

If in decision step 330 the number of storage tank clients 225, 230, 235 that support the message protocol is one, the intelligent router 10 routes the message from the user 15 to that single storage tank client in step 335. For example, the user 15 is running the Linux® operating system. At decision step 330, the intelligent router 10 finds only one storage tank client that operates a "native" implementation of the NFS protocol that is used by the Linux® operating system, storage tank client 2 (230), for example. The intelligent router 10 then routes the message from the user 15 to storage tank client 2 (230).

At decision step 330, the intelligent router 10 may find more than one storage tank client that operates a "native" version of the protocol of the user 15. If so, the intelligent router 10 selects one of the appropriate storage tank clients in step 340.

For example, the user 15 runs the Microsoft Windows® operating system. In step 330, system 10 locates two storage clients that natively supports the Microsoft Windows® CIFS protocol, such as storage tank client 1 (225) and storage tank client 2 (230). In a preferred embodiment of the present invention, the intelligent router 10 randomly selects one of the possible storage tank clients such, as storage tank client 1 (225) as the recipient of the message or request.

In an alternative embodiment, the intelligent router 10 remembers the previous storage tank client used by the user 15 and selects the same storage tank client, for example storage tank client 2 (225), in step 340. To remember the previous storage tank client, the intelligent router 10 uses a source machine unique identifier, such as the media access address and the message protocol type, to determine the appropriate server to receive the message or request. This ensures that the same storage tank client processes all requests from the same upper level client 85. Consequently, the intelligent router 10 does not need to maintain any state information for the protocol.

In another embodiment, the intelligent router 10 could sequentially select (i.e., rotate through) the storage tank clients that support the appropriate native protocol, or could choose the storage tank client to receive the message in any other suitable manner.

Once the storage tank client has been selected, the intelligent router 10 routes the message to the selected storage tank client in step 345. The intelligent router 10 does not change the message contents that are delivered to the storage tank clients. Consequently, any return messages do need not to be routed through the intelligent router 10. However, return messages could be routed through the intelligent router if desired.

It is to be understood that the specific embodiments of the invention that have been described are merely illustrative of certain application of the principle of the present invention. Numerous modifications may be made to the system and method for automatically selecting native protocol implementations in a single system through an intelligent router described herein without departing from the spirit and scope of the present invention. Moreover, while the present invention is described for illustration purpose only in relation to a storage area network, it should be clear that the invention is applicable as well to any file system that allows file sharing among heterogeneous systems.

What is claimed is:

1. A processor-implemented method for automatically performing protocol-based routing of an input command to access a file using an input protocol, to a file storage client capable of natively servicing the same protocol as the input protocol, comprising:

determining the input protocol of the input message;

identifying a plurality of protocols serviced by a plurality of file storage clients;

comparing the input protocol of the input command to the plurality of protocols serviced by the plurality of file storage clients;

selecting the file storage client that is capable of servicing the same protocol as the input protocol, natively without emulation;

automatically routing the input command to a selected file storage client; and wherein the file is accessible through any one of the plurality of protocols.

2. The method of claim 1, wherein the plurality of protocols are serviced natively, without emulation.

3. The method of claim 1, wherein at least some of the plurality of protocols are different.

4. The method of claim 1, wherein automatically routing the input command comprises automatically routing the input command without interaction on the part of a user that issues the input command.

5. The method of claim 4, wherein the user comprises a computer program.

6. The method of claim 4, wherein automatically routing the input command comprises using a router system that appears as a single entity to the user.

7. The method of claim 6, wherein automatically routing the input command comprises establishing a connection to a file storage tank client using a single network address.

8. The method of claim 1, wherein if a plurality of file storage clients are determined to service the input protocol, selecting one of the file storage clients.

9. The method of claim 8, wherein selecting one of the file storage clients comprises randomly selecting a file storage client.

10. The method of claim 8, wherein selecting one of the file storage clients comprises selecting the same storage tank client that was last used by a user issuing the input command.

11. The method of claim 8, wherein selecting one of the file storage clients comprises sequentially selecting the file storage client.

12. The method of claim 1, further comprising storing a list of the plurality of protocols serviced by the file storage clients.

13. The method of claim 4, wherein automatically routing the input command comprises automatically routing the input command without changing the input command content.

14. A computer program product having a plurality of executable instruction codes stored on a computer-usable medium, for automatically performing protocol-based routing of an input command to access a file using an input protocol, to a file storage client capable of natively servicing the same protocol as the input protocol, comprising:

a first set of instruction codes that determines the input protocol of the input message;

the first set of instruction codes further identifies a plurality of protocols serviced by a plurality of file storage clients;
a second set of instruction codes that compares the input protocol of the input command to the plurality of protocols serviced by the plurality of file storage clients;
the second set of instruction codes further selects the file storage client that is capable of servicing the same protocol as the input protocol, natively without emulation;
a third set of instruction codes that automatically route the input command to the selected file storage client; and
wherein the file is accessible through any one of the plurality of protocols.

15. The computer program product of claim 14, wherein the plurality of protocols are serviced natively, without emulation.

16. The computer program product of claim 14, wherein at least some of the plurality of protocols are different.

17. The computer program product of claim 14, wherein the third set of instruction codes automatically routes the input command without interaction on the part of a user that issues the input command.

18. The computer program product of claim 17, wherein the user comprises a computer program.

19. The computer program product of claim 17, wherein the third set of instruction codes uses a router system that appears as a single entity to the user.

20. The computer program product of claim 19, wherein the third set of instruction codes further establishes a connection to the file storage tank client using a single network address.

21. The computer program product of claim 14, wherein if a plurality of file storage clients are determined to service the input protocol, the second set of instruction codes selects one of the file storage clients.

22. The computer program product of claim 21, wherein the second set of instruction codes randomly selects the file storage client.

23. The computer program product of claim 21, wherein the second set of instruction codes selects the same storage tank client that was last used by the user issuing the input command.

24. The computer program product of claim 21, wherein the second set of instruction codes selects the file storage client in a sequential order.

25. The computer program product of claim 14, further comprising a datastore that stores a list of the plurality of protocols serviced by the file storage clients.

26. The computer program product of claim 17, wherein the third set of instruction codes automatically routes the input command without changing the input command content.

27. A processor-implemented storage tank system for automatically performing protocol-based routing of an input command to access a file using an input protocol, to a file storage client capable of natively servicing the same protocol as the input protocol, comprising:
means for determining the input protocol of the input message;
means for identifying a plurality of protocols serviced by a plurality of file storage clients;
means for comparing the input protocol of the input command to the plurality of protocols serviced by the plurality of file storage clients;
means for selecting the file storage client that is capable of servicing the same protocol as the input protocol, natively without emulation;
means for automatically routing the input command to the selected file storage client; and
wherein the file is accessible through any one of the plurality of protocols.

28. The storage tank system of claim 27, wherein the plurality of protocols are serviced natively, without emulation.

29. The storage tank system of claim 27, wherein at least some of the plurality of protocols are different.

30. The storage tank system of claim 27, wherein the means for automatically routing the input command automatically routes the input command without interaction on the part of a user that issues the input command.

31. The storage tank system of claim 30, wherein the user comprises a computer program.

32. The storage tank system of claim 30, wherein the means for automatically routing the input command uses a router system that appears as a single entity to the user.

33. The storage tank system of claim 32, wherein the means for automatically routing the input command establishes a connection to the file storage tank client using a single network address.

34. The storage tank system of claim 27, wherein if a plurality of file storage clients are determined to service the input protocol, the selecting means selects one of the file storage clients.

35. The storage tank system of claim 34, wherein the selecting means randomly selecting the file storage client.

36. The storage tank system of claim 34, wherein the selecting means selecting the same storage tank client that was last used by the user issuing the input command.

37. The storage tank system of claim 34, wherein the selecting means sequentially selecting the file storage client.

38. The storage tank system of claim 27, further comprising a datastore that stores a list of the plurality of protocols serviced by the file storage clients.

39. The storage tank system of claim 30, wherein the means for automatically routing the input command automatically routes the input command without changing the input command content.

* * * * *